Feb. 6, 1968  J. MEDNEY  3,367,656
BOWLING PIN AND METHOD OF MAKING SAME
Filed May 11, 1966

INVENTOR.
JONAS MEDNEY

BY
Leonard H. King
ATTORNEY

United States Patent Office 3,367,656
Patented Feb. 6, 1968

3,367,656
BOWLING PIN AND METHOD OF MAKING SAME
Jonas Medney, Oceanside, N.Y., assignor to Koppers Company, Inc., a corporation of Delaware
Continuation-in-part of application Ser. No. 119,632, June 26, 1961. This application May 11, 1966, Ser. No. 549,269
8 Claims. (Cl. 273—82)

This application is a continuation-in-part of my copending application, Ser. No. 119,632, filed June 26, 1961, now Patent No. 3,257,113 granted on June 21, 1966.

The present invention relates to an improved bowling pin as well as an improved method for making the pin. In particular, the present invention is directed to a bowling pin having a first inner layer of resin bonded glass fibers wound in the hoop direction over the belly portion thereof. A second, outer layer of helically wound resin-bonded glass fibers cover the first winding and extends over the base and belly sections of the pin.

Bowling pins in current use are made of laminated hard wood stock which is turned in a lathe to the desired shape. The shaped pin is then coated with a layer of synthetic resin. The pins in a busy alley last about three months, after which time they must be replaced. Since a typical automatic pin-setting alley employs twenty pins, it will be appreciated that the life of a pin is of great economic importance to the operation of the alley.

In the past, many attempts have been made to reinforce bowling pins with reinforced glass fibers, knit fabric stockings, protective coatings of various types, etc. The reinforcing process employed must be economically feasible, and must not interfere with either the normal playing qualities of the pin or the operation of the automatic pin spotters that are in general usage today. However, as far as is presently known, the prior art approaches have not completely proven successful prior to my copending application, and the present invention is an improvement thereover.

As described in my copending application, hoop windings in the belly portion or ball contacting area of the bowling pin did an excellent job of preventing damage to the pin by spreading the impact load over a larger area of the wood. However, on repeated blows such as is encountered in actual bowling, the hoop windings exhibited some tendency to plastically "work" the wood. As a result the exposed edge or joint between the wood and the glass fibers became discontinuous. While the condition would be manifested only after many hundreds or even thousands of lines of bowling, it is serious enough to interfere with the operation of the automatic pin spotter.

The present invention contemplates improving the bowling pin described in my copending application by helically winding a layer of resin impregnated glass fibers over the hoop winding. Thus the advantageous features of my prior bowling pin are incorporated in the improved bowling pin. Because the joint between the glass fibers and the wood is now remote from the ball contacting point and because the impact load is spread over a larger area of wood, there is little likelihood of a discontinuous surface forming.

Two additional advantages accrue from the concept defined by this invention. When the windings were placed only in the belly portion of the pin, as in my copending application, some slight but still detrimental damage was observed in other areas after repeated impact. By extending the outer, helical windings from the base to the neck area, much of this damage is avoided. The second advantage gained by the present construction is the elimination of the nylon insert that is used in the base of conventional pins. It has been found that, after repeated impacts, the base of the prior pins wore out making the pins unusable. The reinforced glass fibers would last longer and would not "work" under impact as did nylon. Since the outer, helical winding ends over the base of the improved bowling pin, the nylon insert is no longer required.

By using the method of this invention, the improved bowling pin will have the desired sound when struck by a bowling ball. In addition, the bowling pin, having a helically wound covering over a hoop type winding on the belly portion, is less susceptible to deformation. The pin retains its "bounce" effect, even after it has been repeatedly hit by a bowling ball. It is noteworthy that the multi-directional winding of the glass fibers spreads the impact load of the ball over a greater area of the wood than was possible with prior art bowling pins or with a pin having only a hoop winding about the belly portion. Thus, the unit stress at any one point on the surface of the pin is substantially reduced.

Glass fibers, as used in the present application, have a modulus of elasticity of ten million pounds per square inch. The resin used to bond the fibers has a modulus of elasticity of 500,000 pounds per square inch. In combination, resin-bonded glass fibers have a modulus of elasticity between three million and six million pounds per square inch, depending upon the winding angle. The greater winding angle provides the greater modulus of elasticity. Accordingly, a bowling pin wound in the manner to be described distributes the impact load over a greater area, thus reducing the stress per unit area.

The structure of this invention provides a relatively stiff composite outer member on a wood base. The outer member is the resin-bonded glass filaments which have a high modulus of elasticity that will distribute the impact load over a large area of the wood body of the pin. The real strength of the reinforced pin resides in the fibers which are wound under high tension. A minimum amount of plastic resin and a maximum amount of glass is used. The present invention provides a reinforcement having a content of approximately 80% fiber and 20% resin. In addition to the large fiber content, the multi-directional winding, in the hoop direction and also at a rather shallow angle with respect to the longitudinal axis of the pin, spreads the impact load over a larger area. This reduces the unit stress involved at any one point. Whereas, the prior art pins were capable of lasting approximately 400 lines of play, pins made in the manner to be described are still serviceable after 4,000 lines of play. It should be further noted that the rigid filament layers absorb the impact without damage or deformation and prevent the wood therebelow from being damaged or dented.

The term "bowling pin" as employed herein is intended to encompass duck pins, ten pins, candle pins, and the other like devices.

There are many examples in the prior art of attempts to reinforce bowling pins whereby they will either last longer or may be repaired and replaced into service. In one such example an annular undercut is provided for the belly section of the pin and a steel collar is wound thereon. The modulus of elasticity of the steel collar is thirty million pounds per square inch. The shock resulting from the impact of the ball against the steel collar goes directly into the wood without distribution because of the hoop-type wrapping and also because of the material used.

This example from the prior art also suggests, as an alternative, the possibility of using nylon filaments for the wound collar, but it has been found by experimentation that the modulus of elasticity for this material is too low, being in the range of 150,000 pounds per square inch to 500,000 pounds per square inch. Nylon will yield and deform upon impact. Obviously, the structure disclosed by this example from the prior art is different from the present invention, and further will not produce as efficient a pin as is now being claimed.

Still another example of the prior art discloses that it is preferable to use a tubular sleeve of suitable material which can be drawn over the pin. Throughout this example from the prior art, the teachings are directed exclusively to the use of a sleeve and for this reason is structurally different from the present invention. It is also important to note that the elastic sleeve does not uniformly distribute the load, as explained above.

The aforementioned sleeve is under greatest tension only at the region of the largest diameter of the pin; whereas in the present invention a uniform tension that is the maximum permissible by the filaments used. It is apparent that since the aforementioned elastic sleeve is under greatest tension at only one infinitesmal point (a bowling pin has no straight surface—every diametrical dimension is different), all other points of the elastic sleeve will have varying degrees of lesser tension.

The elastic sleeve is first applied over the pin and then impregnated with a suitable lacquer. As the lacquer dries and hardens, the fabric shrinks sufficiently to grip the pin and is cemented to the pin in this condition. Such is not the construction of the present invention, since glass is a heat stable material and does not shrink when the resin is cured. Quite the contrary, the glass filaments are stretched, thus precluding the necessity of subsequent shrinking. It should also be noted that glass is an elastic material and is, as a matter of fact, an almost perfect elastic in that it has no yield point. The stress-strain curve of a glass fiber filament is a straight line.

The prior art, in this instance, discloses that the thin-walled member may comprise adjacent turns of a filament wound spirally about the pin under tension. However, nowhere else does the prior art disclosure indicate, or explain the function of a spirally-wound filament under tension and in fact, the disclosure makes clear that filament winding is not suitable. Nor does the prior disclosure show an appreciation of a substantially hoop oriented winding in combination with a helical winding. The prior art disclosure is directed towards any elastic covering which becomes tensioned after it has been treated to cause shrinking of the covering. The filaments in the prior art device could not be too closely wound under tension, since the filament mass would preclude the passage of impregnating liquid. The prior art discloses only an elastic covering which is capable of being shrunk.

My copending application, referred to in the first paragraph hereinabove, is directed to a bowling pin having a resin-impregnated glass filament wound thereon. Throughout my previous application, emphasis is placed on a winding that is near but not quite perpendicular to the longitudinal axis of the pin. While this construction represented a substantial improvement over the art available at the time of filing the previous application, it has been found by subsequent tests that an increase in the useful life of the pin may be obtained by adding a second winding at a shallower angle. Specifically, the helical winding angle should be within the range of 15 degrees to 35 degrees, and preferably as close as possible to 25 degrees.

While the device of the aforesaid patent application produced an acceptable pin, it was found that there was a tendency for the pin to craze when reliance is placed solely on the windings made at an angle close to 90° in the belly portion of the pin. The crazing would occur along the winding lines. Some difficulty was also encountered in preventing the resin-wet, close-to-90°-winding from slipping, at it was wound under tension over the pin. The performance characteristics of the pin were substantially improved by the addition of the second, helically wound layer of resin impregnated glass fibers.

Accordingly, it is an object of this invention to provide an improved bowling pin having a covering comprising the combination of hoop wound resin-bonded glass filaments covered by helically wound, resin-bonded glass filaments.

It is another object of this invention to provide the aforementioned pin wherein the helical winding angle is between 15 degrees and 35 degrees.

It is a preferred object to provide a bowling pin as mentioned above, having a helical winding angle of approximately 25 degrees.

Yet another object of this invention is to provide a bowling pin having the hoop directed windings only in the belly portion thereof and the helical windings thereover.

Still another object is to provide a bowling pin having resin-bonded glass fibers helically wound, as described above, about the base and belly portions of a bowling pin.

A particular object of this invention is to provide a bowling pin reinforcement having the maximum volume of glass fiber content in combination with the minimum volume of resin.

Still another object is to provide a bowling pin having a filamentary covering comprising approximately 80% fiber and 20% resin.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing, like reference characters designate like parts.

Figure 1:
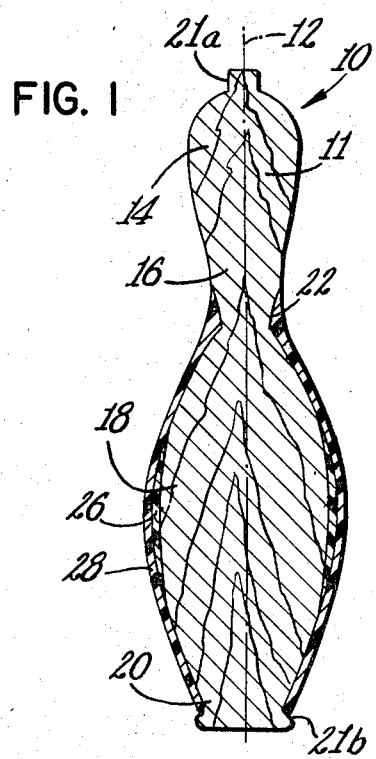
FIG. 1 is a sectional elevational view showing a bowling pin helically wound in accordance with the concept of this invention.

Referring now to FIG. 1, there is shown a typical bowling pin 10 made in accordance with this invention. The pin is fabricated from a wooden blank 11 which is turned to the required shape about its longitudinal axis 12. When the present invention is used to manufacture a new pin, the dimensions of the pin will have to be somewhat smaller and somewhat different in certain areas from the standards established by the American Bowling Congress. The non-standard dimensions are necessary in order to accommodate the layer of filaments and resin which are to be applied. Where the present invention is used to rework an old pin, only the area that is to be covered by the filaments need be turned down.

The pin 10, as shown in FIG. 1, is comprised of a head portion 14, a neck portion 16, a belly portion 18, and a base portion 20. In addition, at the top and bottom ends, extension 21a and 21b, respectively, are provided to facilitate holding the blank on centers in a lathe, for example. These extensions are removed subsequent to the winding operation. In either case, whether the pin be new or old, it is preferable to make an annular undercut 22 proximate the juncture of the neck and belly portions. This will prevent the windings from slipping as they are applied. As used herein, the terms "neck" and "belly" portions conform to definitions supplied by the American Bowling Congress. Roughly, the largest diameter of the pin is approximately 5 inches above the base and the belly portion extends axially approximately one inch above and below the largest pin diameter. The neck portion is directly above and contiguous with the belly portion.

Figure 3:
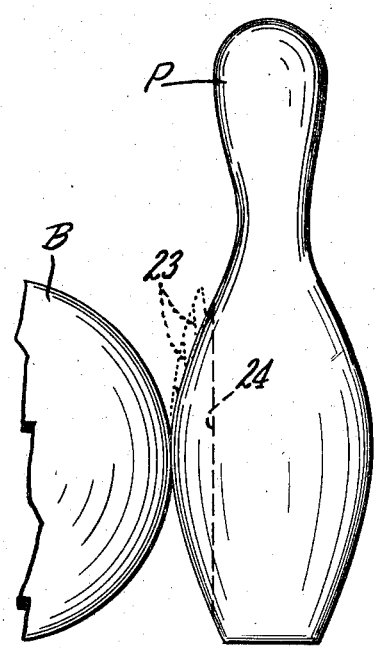
FIG. 3 is a fragmentary elevational view of a conventional, laminated bowling pin at the moment of impact.

The conventional pin P, as shown in FIG. 3, is made by turning down a laminated hardwood blank. The outer laminations 23 extend to the vicinity of the neck portion.

Upon impact by bowling ball B, the top of the laminations tend to deflect outwardly and separate from the core 24, as shown somewhat exaggerated by the dotted lines in FIG. 3. The structural features of this invention prevent this undesired effect from occurring.

Figure 2:
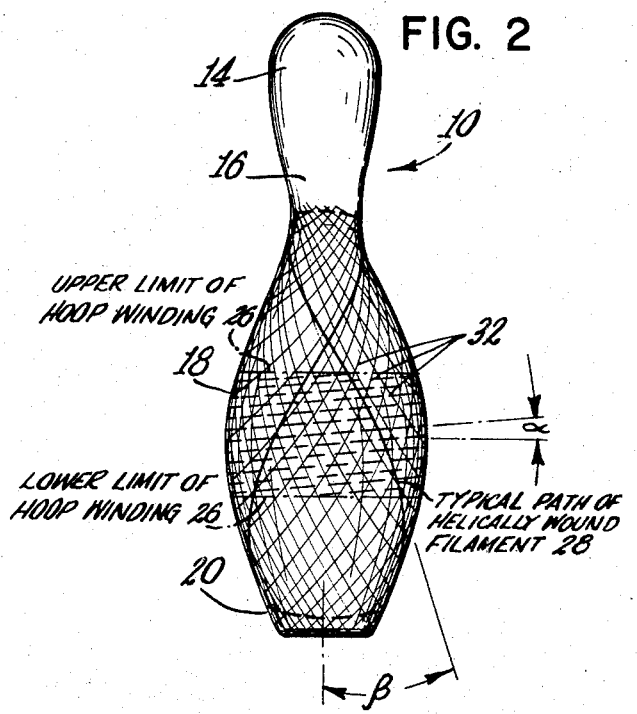
FIG. 2 is an elevational view similar to FIG. 1 showing a completed bowling pin manufactured in accordance with this invention.

In FIG. 2 there is shown a bowling pin wound in accordance with this invention. It will be seen that the hoop windings 26 are localized in the belly portion of the pin and are applied nearly perpendicular to the longitudinal axis of the pin at an angle. The helical windings 28 cover the hoop windings and extend from the base over the entire belly portion terminating in a neck portion area of the pin. The helical windings 28 are formed at a shallow angle B with respect to the longitudinal axis of the pin in a figure-eight pattern; i.e., the pin is turned about its longitudinal axis while a feed-eye (not shown) shuttles back and forth parallel to the longitudinal axis of the pin. The feed-eye motion, in combination with the rate of rotation of the pin, assures that the filaments in both the inner and outer layers are laid down at the desired angle. By conventional practices, the filaments may be preimpregnated with a suitable resin.

Figure 4:
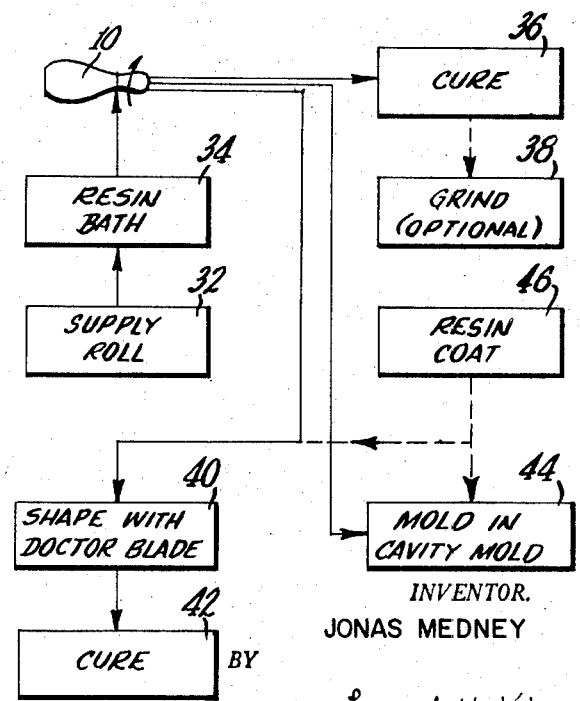
FIG. 4 is a flow chart showing the process of this invention.

FIG. 4 will be used to describe the method of this invention in somewhat greater detail. The wooden bowling pin blank is mounted on a conventional helical winding machine and rotated about its own longitudinal axis. Simultaneously a bundle of fibers is fed from a supply roll or rolls 32 through a bath of resin 34 and placed onto the body of the pin 10 by the longitudinally moving feed-eye. Two distinctly different winding paths are used as described above. A suitable fiber is a glass filament having a diameter of 0.00038 inch and wound with 204 filaments to the end, with many ends forming a flat band.

Maximum tension is maintained on the bundle, the magnitude of tension being limited only by the breaking point of the bundle and the crushing point of the wood. By way of example, for glass fiber, if hard maple is employed for the pin, a tension of about ½ lb. on a 204-filament bundle of 0.00038 inch diameter filaments is suitable. Tension in the range 0.1 to 1.0 lb. per glass fiber bundle of the type described is suitable. As the wall thickness increases, the tension should be relaxed slightly to prevent the inner layers from being placed in compression. Such variation is within the skill of the average filament-winding operator.

After the winding operations are completed, the article is placed in oven 36 and cured. In some cases it is desirable to finish the pin by a subsequent grinding operation 38 to conform the contour of the pin with that of a standard template.

In place of the curing and grinding operations, a doctor blade 40, having the desired contour, may be positioned against a rotating pin having resin impregnated filaments thereon. The resulting, shaped pin is then cured by conventional means 42. Alternatively, another procedure may be followed in which the cure is carried out in a conventional matched cavity mold 44 so that the final product is of the desired configuration. It is to be noted that the pin may be colored by employing suitable pigments in the resin. An additional coat of resin 46 may be applied prior to either the doctor blade shaping step or the cavity molding step.

A preferred resin for this purpose is a plasticized epoxy resin. A typical formula for this resin is as follows:

| | Parts by weight |
|---|---|
| Epoxy resin (Shell Chemical Corp. Epon 826) | 100 |
| Nadic methyl anhydride | 90 |
| Benzol dimethylamine | 2 |
| Plasticizer A | 10 |
| Total | 202 |

Plasticizer A above is a glycidyl ester of dimers and trimers of long chain unsaturated fatty acids having an epoxide value of 0.242 equiv./100 grams of resin and a hydroxyl value of 0.019 equiv./100 grams of resin. The method of making this plasticizer is disclosed in U.S. Patent 2,940,986.

Epoxy resins are condensation products of epichlorohydrin and bisphenol A. The particular resin used in the example was a low viscosity liquid glycidyl ether bisphenolepichlorohydrin, with an epoxide equivalent of from about 0.5 gram/100 grams of resin. Other epoxy resins may be employed, their selection being a matter of choice from lists of commercially available products having suitable properties. The epoxy resin may be plasticized with other materials, for example, Thiokol Chemical Corp. LP-3 which is mercaptan terminated, long chain aliphatic polymer containing disulphide linkages having an average molecular weight of 1000. Suitable formulations are fully described in the Thiokol Chemical Corp. brochure, "Liquid Polymer/Epoxy Resins Systems" (May 1960). Still other plasticizers are commercially available.

A number of resinous compositions have been used with success in fabricating the novel, reinforced plastic bowling pin of this invention. Epoxy resins are generally preferred because of their excellent adhesion to glass, excellent mechanical and age-resistant properties, as well as freedom from shrinkage and evolution of volatiles upon curing. However, other suitable resins such as phenolic, polyester, melamine, novolacs, may be employed in order to reduce the cost of the article. There is also commercially available glass fiber bundles preimpregnated with a coating of B stage resin. This preimpregnated material may be used in the same way.

The commercial definition for B stage resin is as follows: A thermosetting resin reacted to a stage where it softens when heated and swells in contact with liquids but does not entirely fuse or dissolve; it is the preferred stage for resin in molding compositions.

The multi-directional windings employed in this invention take advantage of the desirable characteristic of hoop winding resin reinforced glass fibers in the belly portion of the bowling pin. The outer helical winding of resin reinforced glass fibers goes one step further to assure that the first winding layer does not separate from the wood body at the limits of the winding. The outer helical winding also serves to further spread the impact load of the bowling ball over a still larger area of the wood.

The second outer winding serves two additional functions. First, since the second winding extends from the base of the pin to the neck of the pin, the wood thereunder is protected from damage that would otherwise result from repeated impacts. Second, since the outer winding extends over the base of the pin, the nylon insert that is normally used in conventional pins is no longer required. The reinforced glass fibers used on the improved bowling pin of this invention will not plastically "work" as did the nylon insert of the prior art.

There are also several unobvious advantages of the invention. For example, there is a rapidly decreasing supply of hard woods suitable for producing pins. This invention permits the use of a wood blank about ⅛" less in diameter than conventional pins, thus providing a saving in scarce material and extending the available supply. Further, this invention permits the use of lumber meeting less stringent specifications, thus broadening the available supply and permitting the use of less expensive lumber types than heretofore.

Another feature of this invention is that it permits the reworking of old pins. In this case, the old pin is appropriately shaved down to the shape suitable for the resin-bonded filament wrapping to be added and the pin reinforced in accordance with the invention.

Having thus disclosed the best embodiment of the invention presently contemplated, it is to be understood that various changes and modifications may be made by those skilled in the art without departing from the spirit of the invention.

What is claimed is:

1. A bowling pin of standard size and shape including a core having head, neck, belly, and base portions, positioned successively along the longitudinal axis of said pin, and a layer comprising a plurality of contiguously arranged first filaments wound in the hoop direction over said belly portion, wherein the improvement comprises:
   (a) a plurality of layers of second filaments wound successively over and contiguous with said first filaments and extending onto said neck and base portions, the filaments of each successive layer lying across the filaments of the next previously applied layer and helically with respect to the longitudinal axis of said pin; and
   (b) thermosetting resin holding said filaments in position as a unitary structure on said pin.

2. The structure of claim 1 wherein:
   (a) said second plurality of filaments are wound at a helix angle in the range of 15 to 35 degrees with respect to the longitudinal axis of said pin.

3. The structure of claim 1 wherein:
   (a) said second plurality of filaments form a continuously applied covering on the neck, belly and base portions of said pin.

4. The method for producing a bowling pin comprising the steps:
   (a) shaping material to form a bowling pin core with head, neck, belly and base portions; the belly and a portion of the base and neck being slightly smaller in size than that of a standard finished pin;
   (b) applying a first layer comprised of a first plurality of resin impregnated contiguously arranged filaments to said belly portion in the hoop direction thereof;
   (c) applying over said first layer a plurality of layers of other filaments, each comprised of a plurality of second resin impregnated filaments, said second filaments being arranged helically on said shaped material and contiguous with said first layer, with the filaments of successive layers lying across the filaments of the next previously applied layer, said other layers of filaments terminating on the neck and base portions;
   (d) curing said resin.

5. The method of claim 4 including:
   (a) shaping said applied filaments prior to curing said resin.

6. The method of claim 5 including:
   (a) applying a coating of resin to the filament surface of said bowling pin;
   (b) shaping the resin coating to the desired contour; and
   (c) curing said resin.

7. The method of claim 4 including:
   (a) placing the filament structure in a mold and curing said resin.

8. The method of claim 4 including:
   (a) grinding the outer surface of the filament structure formed on said pin after said resin has cured whereby the contour of said pin conforms to a prescribed shape.

References Cited

UNITED STATES PATENTS

| | | | |
|---|---|---|---|
| 2,105,045 | 1/1938 | Kraft | 273—82 |
| 2,535,033 | 12/1950 | Bergere | 273—82 |
| 2,688,488 | 9/1954 | Crowley | 273—65 |
| 2,737,391 | 3/1956 | Brinkmann | 273—82 |
| 2,738,977 | 3/1956 | Riley | 273—82 |
| 2,876,011 | 3/1959 | Hunt | 273—82 |
| 3,098,655 | 7/1963 | Martin. | |
| 3,115,912 | 12/1963 | Harris | 273—82 |
| 3,141,672 | 7/1964 | Unterbrink | 273—82 |
| 3,152,804 | 10/1964 | Costopoulos | 273—82 |
| 3,248,114 | 4/1966 | Ponemon | 273—82 |
| 3,080,268 | 3/1963 | Bjork | 156—172 X |

OTHER REFERENCES

ABC News, published by American Amateur Baseball Congress, May 1955.

RICHARD C. PINKHAM, *Primary Examiner.*